United States Patent
Rivas et al.

(10) Patent No.: US 11,910,121 B2
(45) Date of Patent: Feb. 20, 2024

(54) CONVERTING DUAL-CONTEXT VIDEO DATA TO FULL COLOR VIDEO

(71) Applicant: ZF FRIEDRICHSHAFEN AG, Friedrichshafen (DE)

(72) Inventors: Anthony Louis Rivas, Royal Oak, MI (US); Matthew W. Warmuth, Northville, MI (US); Christopher Guirlanda, Brighton, MI (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 143 days.

(21) Appl. No.: 17/158,209

(22) Filed: Jan. 26, 2021

(65) Prior Publication Data
US 2022/0239845 A1 Jul. 28, 2022

(51) Int. Cl.
*H04N 5/265* (2006.01)
*G06T 7/269* (2017.01)
(Continued)

(52) U.S. Cl.
CPC .......... *H04N 5/265* (2013.01); *G06T 7/269* (2017.01); *H04N 9/43* (2013.01); *H04N 9/77* (2013.01);
(Continued)

(58) Field of Classification Search
None
See application file for complete search history.

(56) References Cited

U.S. PATENT DOCUMENTS

| 2006/0082847 A1* | 4/2006 | Sugimoto | G03B 17/20 |
| | | | 358/518 |
| 2008/0297622 A1* | 12/2008 | Miyashita | H04N 23/632 |
| | | | 348/E5.022 |

(Continued)

FOREIGN PATENT DOCUMENTS

CN 112785510 A * 5/2021

OTHER PUBLICATIONS

Cheng Ming et al: "A Dual Camera System for High Spatiotemporal Resolution Video Acquisition", IEEE Transactions On Pattern Analysis and Machine Intelligence, IEEE Computer Society, USA, vol. 43, No. 10, Apr. 1, 2020 (Apr. 1, 2020), pp. 3275-3291, XP011875099, ISSN: 0162-8828, DOI: 10.1109/TPAMI.2020.2983371 [retrieved on Sep. 1, 2021] the whole document.

(Continued)

*Primary Examiner* — Quan Pham
(74) *Attorney, Agent, or Firm* — TAROLLI, SUNDHEIM, COVELL & TUMMINO L.L.P.

(57) ABSTRACT

Systems and methods are provided for generating color video from a dual-context camera. A dual-context camera provides a first series of video frames encoded in accordance with a full color model and a second series of video frames encoded in accordance with an underdetermined color model. The two series of video frames are interleaved as to form a series of pairs of frames, each comprising a color video frame and an underdetermined video frame. An image merger generates a composite image for each pair of frames in the series of frames. The composite image includes a set of brightness values from the underdetermined video frame and a set of chrominance values from the color video frame. A color video source replaces the underdetermined image in each of the series of pairs of frames with the composite (Continued)

image generated for the pair of frames to provide a color video stream.

20 Claims, 2 Drawing Sheets

(51) Int. Cl.
*H04N 9/77* (2006.01)
*H04N 23/10* (2023.01)
*H04N 9/43* (2006.01)

(52) U.S. Cl.
CPC ... *H04N 23/10* (2023.01); *G06T 2207/10024* (2013.01); *G06T 2207/20081* (2013.01); *G06T 2207/20221* (2013.01)

(56) References Cited

U.S. PATENT DOCUMENTS

| | | | |
|---|---|---|---|
| 2009/0167909 A1* | 7/2009 | Imagawa | H04N 5/23245 348/262 |
| 2013/0342740 A1* | 12/2013 | Govindarao | H04N 9/04515 348/262 |
| 2019/0377110 A1* | 12/2019 | Eytan | H04N 23/57 |
| 2021/0058566 A1* | 2/2021 | Nakajima | H04N 5/2628 |
| 2021/0076017 A1* | 3/2021 | Yokokawa | G06T 5/20 |

OTHER PUBLICATIONS

PCT/I62021/061250 International Preliminary Report on Patentablity—Date of Issuance—dated Jul. 31, 2023.

\* cited by examiner

CONVERTING DUAL-CONTEXT VIDEO DATA TO FULL COLOR VIDEO

TECHNICAL FIELD

This invention relates to image processing, and more particularly, to conversion of dual-context video data to full color video.

BACKGROUND

The video data needed for machine learning tasks is often different from what would be suitable for viewing by a human being. For example, in some vehicle safety systems, a machine learning model associated with the system is provided with separate grayscale and color streams from a single imaging sensor, referred to herein as a dual-context camera.

SUMMARY OF THE INVENTION

In accordance with an aspect of the present invention, a system is provided. The system includes a dual-context camera that provides a first series of video frames encoded in accordance with a full color model and a second series of video frames encoded in accordance with an underdetermined color model. The first series of video frames and the second series of video frames are interleaved as to form a series of pairs of frames, each comprising a color video frame and an underdetermined video frame. An image merger generates a composite image for each pair of frames in the series of frames. The composite image includes a set of brightness values from the underdetermined video frame and a set of chrominance values from the color video frame. A color video source replaces the underdetermined image in each of the series of pairs of frames with the composite image generated for the pair of frames to provide a color video stream.

In accordance with another aspect of the present invention, a method is provided. A first series of video frames encoded in accordance with a full color model and a second series of video frames encoded in accordance with an underdetermined color model are provided. The first series of video frames and the second series of video frames are interleaved as to form a series of pairs of frames, with each pair of frames in the series of frames comprising a color video frame and an underdetermined video frame. A composite image is generated for each pair of frames in the series of frames including a set of brightness values from the underdetermined video frame and a set of chrominance values from the color video frame. The underdetermined image in each of the series of pairs of frames is replaced with the composite image generated for the pair of frames to provide a color video stream.

In accordance with a further aspect of the present invention, a system is provided. A dual-context camera provides a series of color video frames and a series of grayscale video frames. The series of color video frames and the series of grayscale video frames are interleaved as to form a series of pairs of frames, each comprising a color video frame and a grayscale video frame. An image merger generates a composite image for each pair of frames in the series of frames. The composite image includes a set of brightness values from the grayscale video frame and a set of chrominance values from the color video frame. A color video source replaces the grayscale image in each of the series of pairs of frames with the composite image generated for the pair of frames to provide a color video stream.

DETAILED DESCRIPTION

A "chrominance value," as used herein, is a value representing a color content of a pixel, either directly, such as the red, green, and blue values in a Red-Blue-Green (RGB) color model, or in a relative manner, such as the red-difference and blue-difference values in a YCrCb color model.

A "full color model" is a color model in which each pixel within an image or video frame is represented by at least three parameters.

An "underdetermined color model" is a color model in which each pixel within an image or video frame is represented by less than three parameters.

A "dual-context camera," as used herein, is a sensor that collects two series of video frames, with one series of video frames encoded in accordance with a full color model and another series of video frames encoded in accordance with an underdetermined color model. In one example, a dual-context camera can provide a first series of video frames encoded according to an RGB color model and a second series of video frames encoded in a grayscale representation with only a luminance or brightness value.

A grayscale image or video frame is an image or video frame that is encoded in a single parameter color model, such that each pixel is represented by a single value. In general, each pixel value in a grayscale image represents a brightness or luminance value.

"Color video," as used herein, is video in which each frame of the video is encoded in a three-parameter color model. Examples of three-parameter color models include the RGB model and the YCrCb model, which encodes each pixel using a brightness value and two chrominance values, representing, respectively, a difference between a red component of the pixel and a yellow component of the pixel, and a difference between a blue component of the pixel and a yellow component of the pixel.

A "trichromatic color model," as used herein, is a color model in which each pixel is encoded using three chrominance values. The RGB is an example of a trichromatic color model.

A "luma-chroma color model," as used herein, is a color model in which each pixel is encoded using a brightness or luminance value and two chrominance values.

Figure 1:
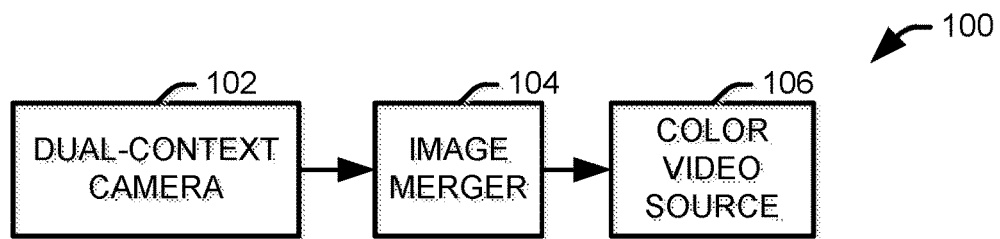
FIG. 1 illustrates a system that produces a color video stream from a dual-context camera.

FIG. 1 illustrates a system 100 that produces a color video stream from a dual-context camera 102. The dual-context camera 102 that provides a first series of video frames encoded in accordance with a full color model and a second series of video frames encoded in accordance with an underdetermined color model interleaved as to form a series of pairs of frames. In one example, the second series of video frames are provided as grayscale video frames. In the illustrated implementation, the dual-context camera can provide each series of video frame rates at a frame rate less than the twenty-four frames per second (FPS) that are generally believed necessary to provide video with realistic motion for a human viewer. In one implementation, each of the first series of video frames and the second series of video frames are provided at eighteen FPS, with the interleaved video provided at thirty-six FPS.

An image merger 104 generates a composite image for each pair of frames in the series of frames using at least a brightness value from an associated frame of the second series of video frames and a set of at least one chrominance value from the color video frame. The image merger 104 uses color information from the full color frame before a given underdetermined color frame to provide a full color composite image representing that frame. A color video source 106 replaces the grayscale image in each of the series of pairs of frames with the composite image generated for the pair of frames to provide a color video stream. Since each underdetermined image from the dual-context camera 102 is replaced with the full color composite image, the color video stream can be provided at a full frame rate of the dual-context camera. It will be appreciated that each of the image merger 104 and the color video source 106 can be implemented as software instructions executed by an associated processor, dedicated hardware (e.g., an application specific integrated surface or a field programmable gate array), or a combination of software instructions and dedicated hardware.

Figure 2:
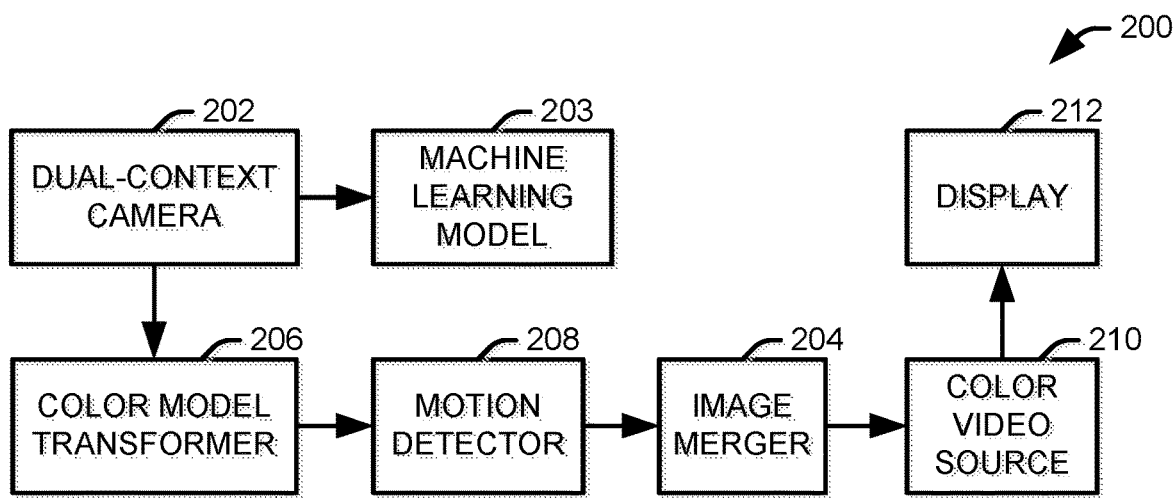
FIG. 2 illustrates one example of a system that produces a color video stream from a dual-context camera.

FIG. 2 illustrates one example of a system 200 that produces a color video stream from a dual-context camera 202. In the illustrated example, the dual-context camera 202 provides a series of color video frames encoded in accordance with a full color model and a series of grayscale video frames interleaved as to form a series of pairs of frames. In the illustrated implementation, the dual-context camera provides a total frame rate of thirty-six FPS, with eighteen color frames per second and eighteen grayscale FPS, to a machine learning system 203 associated with one or more vehicle safety systems. In one example, the dual-context camera 202 is an eight-megapixel imager using a Red-Yellow-Yellow-Cyan (RYYCy) color filter, such that the color video frames are encoded in accordance with a Red-Yellow-Cyan color model. It will be appreciated that the imager merger 204, the color model transformer 206, the motion detector 208, and the color video source 210 can each be implemented as dedicated hardware, such as an application specific integrated circuit, as software instructions stored on a non-transitory computer-readable medium, or as a combination of dedicated hardware and software instructions.

An image merger 204 generates a composite image for each pair of frames in the series of frames, with each pixel of the composite image using the brightness value of a corresponding pixel from the grayscale frame and two chrominance values from a corresponding pixel in the color video frame. In one example, the color video frames are encoded in a luma-chroma color model, such as YCrCb, such that the two chrominance values associated with each pixel can be readily extracted for use with a brightness value from the grayscale video frame. It will be appreciated, however, that some cameras may provide the color frames in a trichromatic color model, such as the Red-Blue-Green (RBG) color model. In the illustrated example, a color model transformer 206 can generate, from a color video frame encoded in a trichromatic color model, a color image encoded in a luma-chroma color model. For example, the color model transformer 206 can receive a vector of chromaticity values for each pixel and multiply the chromaticity values by an appropriate color matrix to represent the pixel in the luma-chroma color model. In the example of translating a pixel encoded in the RBG color model to the YCrCb color model, the color matrix translation can be represented as:

$$\begin{bmatrix} Y \\ Cr \\ Cb \end{bmatrix} = \begin{bmatrix} K_R & K_G & K_B \\ -0.5\frac{K_R}{1-K_B} & -0.5\frac{K_G}{1-K_B} & 0.5 \\ 0.5 & -0.5\frac{K_G}{1-K_R} & -0.5\frac{K_B}{1-K_R} \end{bmatrix} \begin{bmatrix} R \\ G \\ B \end{bmatrix} \quad \text{Eq. 1}$$

where R is the red component value in the RGB color model, G is the green component value in the RGB color space, B is the blue component value in the RGB color model, Y is the brightness value in the YCrCb color model, Cr is the red difference value in the YCrCb color space, Cb is the blue difference value in the YCrCb color space, and $K_R$, $K_G$, and $K_B$ are constants derived from the definition of the RGB space constrained such that $K_R + K_G + K_B = 1$.

In one example, the corresponding pixels between the grayscale video frame and the color video frame can be pixels having a same position within the frame. In this example, it is assumed that the two video frames are provided with the same resolution. Where the two video frames do not have the same resolution, a given pixel in the video frame having the lesser resolution (e.g., the grayscale video frame) may provide values for multiple pixels for a composite image having a greater resolution. Alternatively, the composite image can be generated at the lesser resolution, such that values from sets of pixels in the video frame having the greater resolution (e.g., the color video frame) are combined to provide a value for the composite image.

In another example, the corresponding pixels between the grayscale video frame and the color video frame can be selected to account for motion between the grayscale and the color video frame. To this end, the system 200 includes a motion detector 208 that uses an optical flow algorithm to detect motion between the color video frame and the underdetermined video frame and select the set of chrominance values from the color video frame according to the detected motion. Once the composite image has been generated, a color video source 210 replaces the grayscale image in each of the series of pairs of frames with the composite image generated for the pair of frames to provide a color video stream. In the illustrated implementation, the color video stream is provided to a display 212 that allows the color video stream to be viewed by a human operator.

Figure 3:
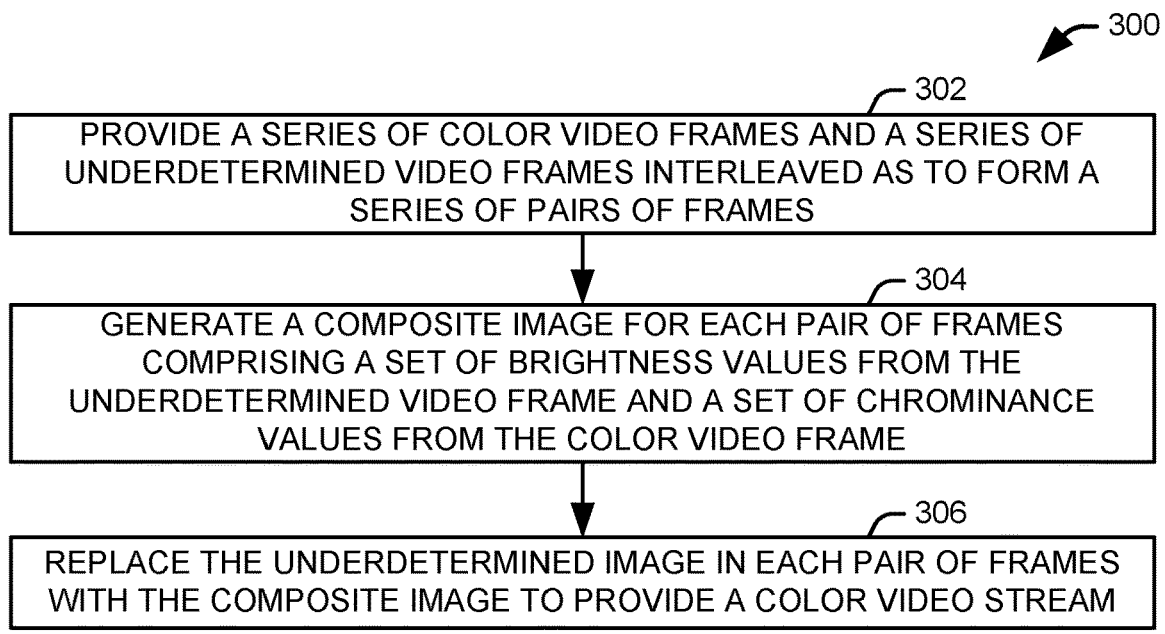
FIG. 3 illustrates a method for providing full color video from a dual context camera.
Figure 4:
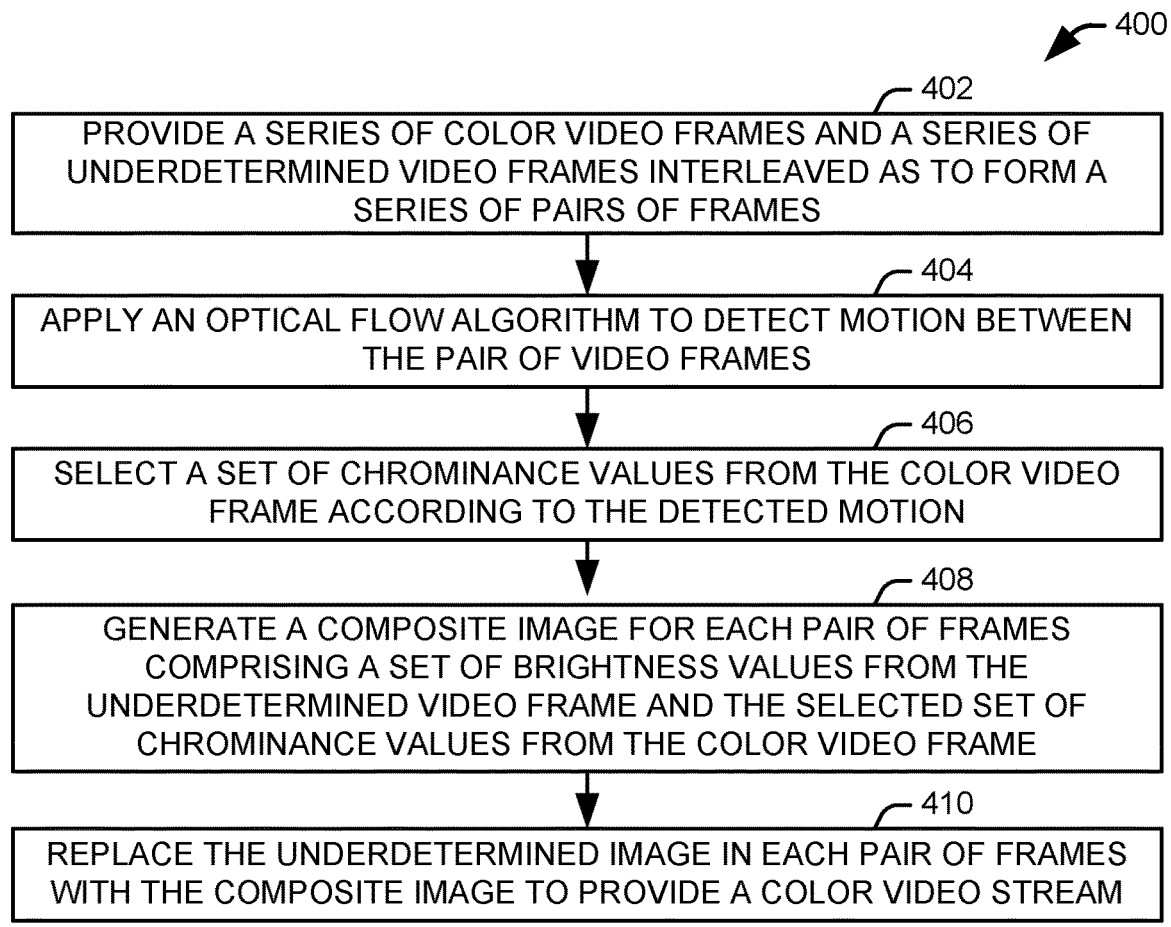
FIG. 4 illustrates an example implementation of a method for providing full color video from a dual context camera.

In view of the foregoing structural and functional features described above in FIGS. 1 and 2, example methods will be better appreciated with reference to FIGS. 3 and 4. While, for purposes of simplicity of explanation, the methods of FIGS. 3 and 4 are shown and described as executing serially, it is to be understood and appreciated that the present invention is not limited by the illustrated order, as some actions could in other examples occur in different orders and/or concurrently from that shown and described herein.

FIG. 3 illustrates a method 300 for providing full color video from a dual context camera. At 302, a first series of video frames encoded in accordance with a full color model and a second series of video frames encoded in accordance with an underdetermined color model are provided. The two series of video frames are interleaved as to form a series of pairs of frames, with each pair of frames in the series of frames comprising a color video frame and an underdetermined video frame. At 304, a composite image is generated for each pair of frames in the series of frames comprising a set of brightness values from the underdetermined video frame and a set of chrominance values from the color video frame.

In one example, each of the first series of video frames is encoded in a luma-chroma color model with each of a plurality of pixels in the color video frame represented as a luminosity value and two chrominance values. In this example, the composite image for each pair of frames is generated such that each pixel of a plurality of pixels in the composite image is represented as the brightness value from a corresponding pixel in the underdetermined image associated with the composite image and the two chrominance values associated with a corresponding pixel in the color video frame associated with the composite image. Where the two video frames have a same resolution, the corresponding pixels can be pixels that are in a same location in each image or can be selected according to motion between the frames as detected by an optical flow algorithm. Where the underdetermined video frame has a resolution less than that of the composite image, a given pixel in the underdetermined video frame can be used to provide a brightness value for a set of multiple pixels in the composite image, which the color information is provided from the corresponding pixels in the color video frame.

In another example, each of the first series of video frames is encoded in a trichromatic color model with each of a plurality of pixels in the color video frame represented as three chrominance values. In this example, a color image encoded in a luma-chroma color model is generated from the color video frame, and the composite image is generated using the brightness value from a corresponding pixel in the underdetermined image associated with the composite image and the two chrominance values associated with a corresponding pixel in the color video frame associated with the composite image. The underdetermined image in each of the series of pairs of frames is then replaced with the composite image generated for the pair of frames at 306 to provide a color video stream.

FIG. 4 illustrates an example implementation of a method 400 for providing full color video from a dual context camera. At 402, a first series of video frames encoded in accordance with a full color model and a second series of video frames encoded in accordance with an underdetermined color model are provided. The two series of video frames are interleaved as to form a series of pairs of frames, with each pair of frames in the series of frames comprising a color video frame and an underdetermined video frame. At 404, for each pair of frames of the series of pairs of frames, an optical flow algorithm that detects motion between the color video frame and the underdetermined video frame in the pair of frames is applied. At 406, a set of chrominance values from the color video frame is selected for the composite image according to the detected motion. Essentially, the optical flow analysis is used to match corresponding pixels between the two video frames, such that the brightness values in the underdetermined model can be matched with chrominance values in the color video frame.

At 408, a composite image is generated for each pair of frames in the series of frames comprising a set of brightness values from the underdetermined video frame and the selected chrominance values from the color video frame. The underdetermined image in each of the series of pairs of frames is then replaced with the composite image generated for the pair of frames at 410 to provide a color video stream.

Figure 5:
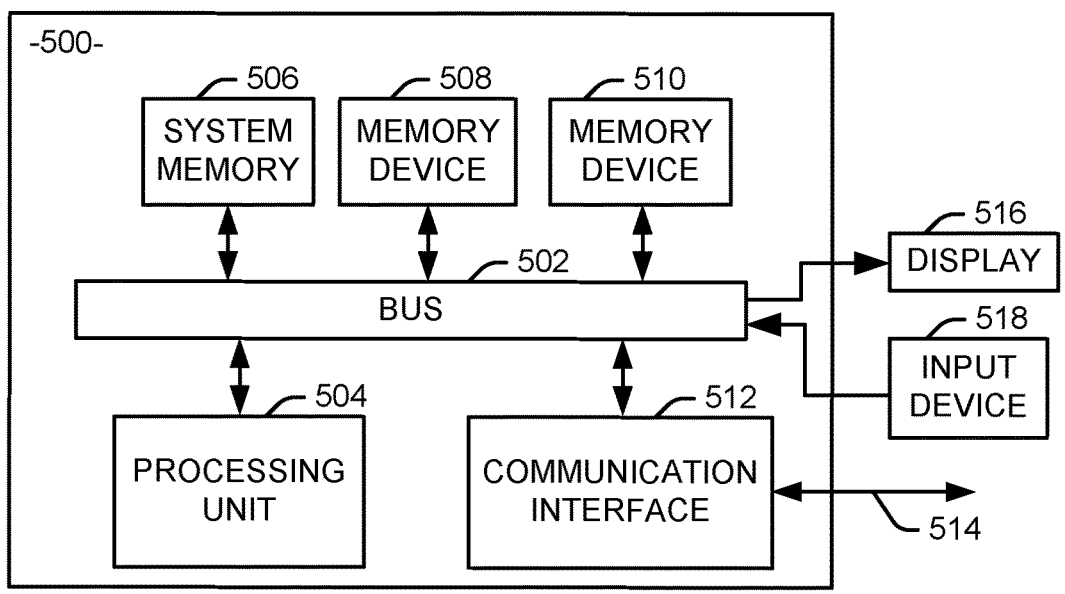
FIG. 5 is a schematic block diagram illustrating an exemplary system of hardware components capable of implementing examples of the systems and methods disclosed in FIGS. 1-4.

FIG. 5 is a schematic block diagram illustrating an exemplary system 500 of hardware components capable of implementing examples of the systems and methods disclosed in FIGS. 1-4, such as the image merger 104 illustrated in FIG. 1. The system 500 can include various systems and subsystems. The system 500 can be a personal computer, a laptop computer, a workstation, a computer system, an appliance, an application-specific integrated circuit (ASIC), a field programmable gate array, a server, a server blade center, a server farm, etc.

The system 500 can includes a system bus 502, a processing unit 504, a system memory 506, memory devices 508 and 510, a communication interface 512 (e.g., a network interface), a communication link 514, a display 516 (e.g., a video screen), and an input device 518 (e.g., a keyboard and/or a mouse). The system bus 502 can be in communication with the processing unit 504 and the system memory 506. The additional memory devices 508 and 510, such as a hard disk drive, server, stand-alone database, or other non-volatile memory, can also be in communication with the system bus 502. The system bus 502 interconnects the processing unit 504, the memory devices 506-510, the communication interface 512, the display 516, and the input device 518. In some examples, the system bus 502 also interconnects an additional port (not shown), such as a universal serial bus (USB) port.

The processing unit 504 can be a computing device and can include an application-specific integrated circuit (ASIC). The processing unit 504 executes a set of instructions to implement the operations of examples disclosed herein. The processing unit can include a processing core.

The additional memory devices 506, 508, and 510 can store data, programs, instructions, database queries in text or compiled form, and any other information that can be needed to operate a computer. The memories 506, 508 and 510 can be implemented as computer-readable media (integrated or removable) such as a memory card, disk drive, compact disk (CD), or server accessible over a network. In certain examples, the memories 506, 508 and 510 can comprise text, images, video, and/or audio, portions of which can be available in formats comprehensible to human beings. Additionally or alternatively, the system 500 can access an external data source or query source through the communication interface 512, which can communicate with the system bus 502 and the communication link 514.

In operation, the system 500 can be used to implement one or more parts of a system in accordance with the present invention. Computer executable logic for implementing the system resides on one or more of the system memory 506, and the memory devices 508, 510 in accordance with certain examples. The processing unit 504 executes one or more computer executable instructions originating from the system memory 506 and the memory devices 508 and 510. The term "computer readable medium" as used herein refers to any medium that participates in providing instructions to the processing unit 504 for execution, and it will be appreciated that a computer readable medium can include multiple computer readable media each operatively connected to the processing unit.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

What have been described above are examples of the present invention. It is, of course, not possible to describe every conceivable combination of components or methodologies for purposes of describing the present invention, but one of ordinary skill in the art will recognize that many further combinations and permutations of the present invention are possible. While certain novel features of this invention shown and described below are pointed out in the annexed claims, the invention is not intended to be limited to the details specified, since a person of ordinary skill in the relevant art will understand that various omissions, modifications, substitutions and changes in the forms and details of the invention illustrated and in its operation may be made without departing in any way from the spirit of the present invention. Accordingly, the present invention is intended to embrace all such alterations, modifications, and variations that fall within the scope of the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements. No feature of the invention is critical or essential unless it is expressly stated as being "critical" or "essential."

What is claimed is:

1. A system comprising:
    a dual-context camera that provides a first series of video frames encoded in accordance with a full color model and a second series of video frames encoded in accordance with an underdetermined color model, the first series of video frames and the second series of video frames being interleaved as to form a series of pairs of frames, each comprising a color video frame and an underdetermined video frame;
    an image merger that generates a composite image for each pair of frames in the series of frames, the composite image comprising a set of brightness values from the underdetermined video frame and a set of chrominance values from the color video frame; and
    a color video source that replaces the underdetermined video frame in each of the series of pairs of frames with the composite image generated for the pair of frames to provide a color video stream, such that the color video stream comprises the first series of video frames and the composite image generated for each pair of frames of the series of pairs of frames.

2. The system of claim 1, wherein each of the first series of video frames is encoded in a luma-chroma color model with each of a plurality of pixels in the color video frame represented as a luminosity value and two chrominance values, and the image merger generating the composite image such that each pixel of a plurality of pixels in the composite image is represented as the brightness value from a corresponding pixel in the underdetermined video frame associated with the composite image and the two chrominance values associated with a corresponding pixel in the color video frame associated with the composite image.

3. The system of claim 1, wherein the system further comprises a motion detector that uses an optical flow algorithm that detects motion between the color video frame and the underdetermined video frame in a given pair of frames and selects the set of chrominance values for the composite image from the color video frame according to the detected motion.

4. The system of claim 1, wherein each of the first series of video frames is encoded in a trichromatic color model with each of a plurality of pixels in the color video frame represented as three chrominance values, the system further comprising a color model transformer that generates, from the color video frame, a color image encoded in a luma-chroma color model with each of a plurality of pixels in the color video frame represented as a luminosity value and two chrominance values.

5. The system of claim 4, the image merger generating the composite image such that each pixel of a plurality of pixels in the composite image is represented as the brightness value from a corresponding pixel in the underdetermined video frame associated with the composite image and the two chrominance values associated with a corresponding pixel in the color video frame associated with the composite image.

6. The system of claim 1, wherein the underdetermined video frame has a resolution less than that of the composite image, and a given pixel in the underdetermined video frame provides a brightness value for a set of multiple pixels in the composite image.

7. The system of claim 1, wherein the color video frame has a resolution greater than that of the composite image, and a plural set of pixels in the color video frame is used to provide a chrominance value for a pixel in the composite image.

8. The system of claim 1, the system further comprising a machine learning model that receives the first series of color video frames and the second series of video frames from the dual-context camera and a video display that receives the color video stream.

9. The system of claim 1, wherein a dual-context camera comprises a Red-Yellow-Yellow-Cyan color filter, such that the first series of video frames are encoded in accordance with a Red-Yellow-Cyan color model.

10. A method comprising:
providing a first series of video frames encoded in accordance with a full color model and a second series of video frames encoded in accordance with an underdetermined color model, the first series of video frames and the second series of video frames being interleaved as to form a series of pairs of frames, with each pair of frames in the series of frames comprising a color video frame and an underdetermined video frame;
generating a composite image for each pair of frames in the series of frames comprising a set of brightness values from the underdetermined video frame and a set of chrominance values from the color video frame; and
replacing the underdetermined video frame in each of the series of pairs of frames with the composite image generated for the pair of frames to provide a color video stream, such that the color video stream comprises the first series of video frames and the composite image generated for each pair of frames of the series of pairs of frames.

11. The method of claim 10, further comprising:
applying, for each pair of frames of the series of pairs of frames, an optical flow algorithm that detects motion between the color video frame and the underdetermined video frame in the pair of frames; and
selecting the set of chrominance values from the color video frame for the composite image according to the detected motion.

12. The method of claim 10, wherein each of the first series of video frames is encoded in a trichromatic color model with each of a plurality of pixels in the color video frame represented as three chrominance values, the method further comprising:
generating, from the color video frame, a color image encoded in a luma-chroma color model with each of a plurality of pixels in the color video frame represented as a luminosity value and two chrominance values;
wherein generating a composite image for each pair of frames comprises generating the composite image such that each pixel of a plurality of pixels in the composite image is represented as the brightness value from a corresponding pixel in the underdetermined video frame associated with the composite image and the two chrominance values associated with a corresponding pixel in the color video frame associated with the composite image.

13. The method of claim 10, wherein the underdetermined video frame has a resolution less than that of the composite image, and a given pixel in the underdetermined video frame provides a brightness value for a set of multiple pixels in the composite image.

14. The method of claim 10, wherein each of the first series of video frames is encoded in a luma-chroma color model with each of a plurality of pixels in the color video frame represented as a luminosity value and two chrominance values, and generating a composite image for each pair of frames comprises generating the composite image such that each pixel of a plurality of pixels in the composite image is represented as the brightness value from a corresponding pixel in the underdetermined video frame associated with the composite image and the two chrominance values associated with a corresponding pixel in the color video frame associated with the composite image.

15. The method of claim 10, wherein the second series of video frames are provided as grayscale video frames.

16. A system comprising:
a dual-context camera that provides a series of color video frames and a series of grayscale video frames, the series of color video frames and the series of grayscale video frames being interleaved as to form a series of pairs of frames, each comprising a color video frame and a grayscale video frame;
an image merger that generates a composite image for each pair of frames in the series of frames, the composite image comprising a set of brightness values from the grayscale video frame and a set of chrominance values from the color video frame; and
a color video source that replaces the grayscale video frame in each of the series of pairs of frames with the composite image generated for the pair of frames to provide a color video stream, such that the color video stream comprises the first series of color video frames and the composite image generated for each pair of frames of the series of pairs of frames.

17. The system of claim 16, wherein each of the series of color video frames is encoded in a trichromatic color model with each of a plurality of pixels in the color video frame represented as a three chrominance values, the system further comprising a color model transformer that generates, from the color video frame, a color image encoded in a luma-chroma color model with each of a plurality of pixels in the color video frame represented as a luminosity value and two chrominance values, the image merger generating the composite image such that each pixel of a plurality of pixels in the composite image is represented as the brightness value from a corresponding pixel in the grayscale video frame associated with the composite image and the two chrominance values associated with a corresponding pixel in the color video frame associated with the composite image.

18. The system of claim 16, wherein each of the series of color video frames is encoded in a luma-chroma color model with each of a plurality of pixels in the color video frame represented as a luminosity value and two chrominance values, and the image merger generating the composite image such that each pixel of a plurality of pixels in the composite image is represented as the brightness value from a corresponding pixel in the grayscale video frame associated with the composite image and the two chrominance values associated with a corresponding pixel in the color video frame associated with the composite image.

19. The system of claim 16, the system further comprising a machine learning model that receives the series of color video frames and the series of grayscale video frames from the dual-context camera and a video display that receives the color video stream.

20. The system of claim 16, wherein the system further comprises a motion detector that uses an optical flow algorithm that detects motion between the color video frame and the grayscale video frame in a given pair of frames and selects the set of chrominance values for the composite image from the color video frame according to the detected motion.

\* \* \* \* \*